United States Patent [19]
Komninos

[11] Patent Number: 6,079,275
[45] Date of Patent: Jun. 27, 2000

[54] SIGNAL DETECTION INSTRUMENT WITH TOUCH PROBE RESONATOR ASSEMBLY FOR USE THEREWITH

[75] Inventor: Nikolaos I. Komninos, Littleton, Colo.

[73] Assignee: Radiaulics, Inc., Littleton, Colo.

[21] Appl. No.: 09/228,006

[22] Filed: Jan. 8, 1999

[51] Int. Cl.[7] .................................................. G01H 11/00
[52] U.S. Cl. ............................................................. 73/661
[58] Field of Search ............................. 73/661, 658, 649, 73/40.5 A; 367/174

[56] References Cited

U.S. PATENT DOCUMENTS

| | | |
|---|---|---|
| Re. 33,977 | 6/1992 | Goodmand et al. . |
| 2,900,039 | 8/1959 | Burnett ........................................ 73/661 |
| 3,089,333 | 5/1963 | Kleesattel ................................... 73/661 |
| 3,098,379 | 7/1963 | Crawford ................................... 73/661 |
| 3,477,280 | 11/1969 | Blackmer ................................... 73/661 |
| 3,500,676 | 3/1970 | Palmer . |
| 3,592,967 | 7/1971 | Harris . |
| 3,978,915 | 9/1976 | Harris . |
| 4,416,145 | 11/1983 | Goodman et al. . |
| 4,430,611 | 2/1984 | Boland . |
| 4,455,863 | 6/1984 | Huebler et al. ....................... 73/40.5 A |
| 5,089,997 | 2/1992 | Pecukonis . |
| 5,103,675 | 4/1992 | Komninos . |
| 5,432,755 | 7/1995 | Komninos . |
| 5,436,556 | 7/1995 | Komninos . |
| 5,945,603 | 8/1999 | Shih ........................................ 73/652 |

*Primary Examiner*—Hezron Williams
*Assistant Examiner*—Richard A. Moller
*Attorney, Agent, or Firm*—Timothy J. Martin; Michael R. Henson; Mark H. Weygandt

[57] ABSTRACT

A resonator assembly adapted for use with a signal detection instrument includes a sensor operative to detect airborne sound signals and a touch rod. The resonator assembly operates to convert sound signals traveling within the touch rod into the airborne sound signals for detection by the sensor and comprises a mount adapted to interconnect the signal detection instrument and the touch rod, a flexible resonator element, and a stem interconnecting the mount and the resonator element so that, when the touch rod is secured to the mount and the mount is secured to the signal detection instrument thereby positioning the resonator element relative to the sensor, the resonator element operates to convert the sound signals traveling within the touch rod into the airborne sound signals for detection by the sensor. A touch probe resonator is also provided for converting sound signals traveling in a first medium into sound signals traveling in a second medium for detection by a sensor. The touch probe resonator broadly comprises a mount, an elongated touch rod and a resonator element. A signal detection instrument is also provided for monitoring input sound signals having frequencies over a selected range and for producing output in response thereto. The signal detection instrument comprises a housing, processing circuitry, an output device and a sensor assembly which includes an elongated touch rod, a resonator assembly and a sensor.

35 Claims, 3 Drawing Sheets

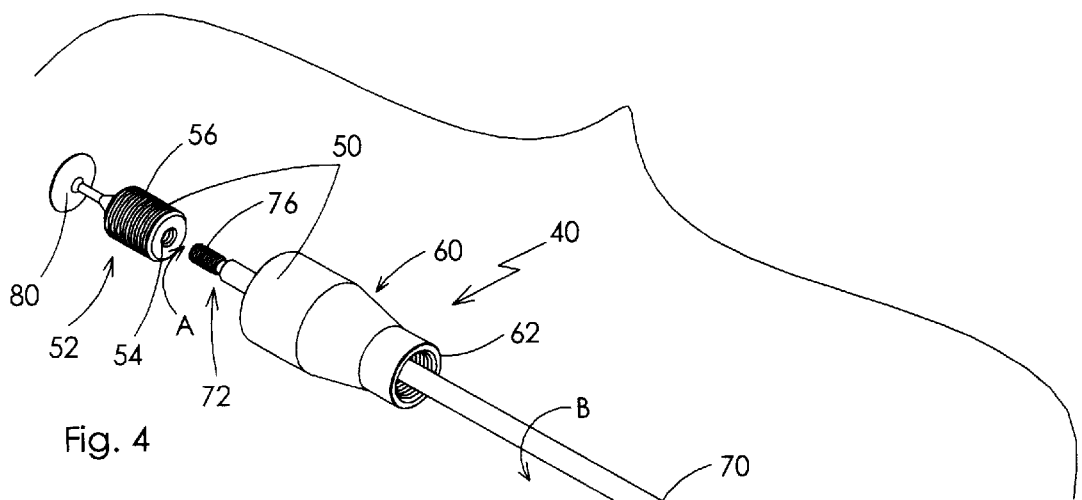
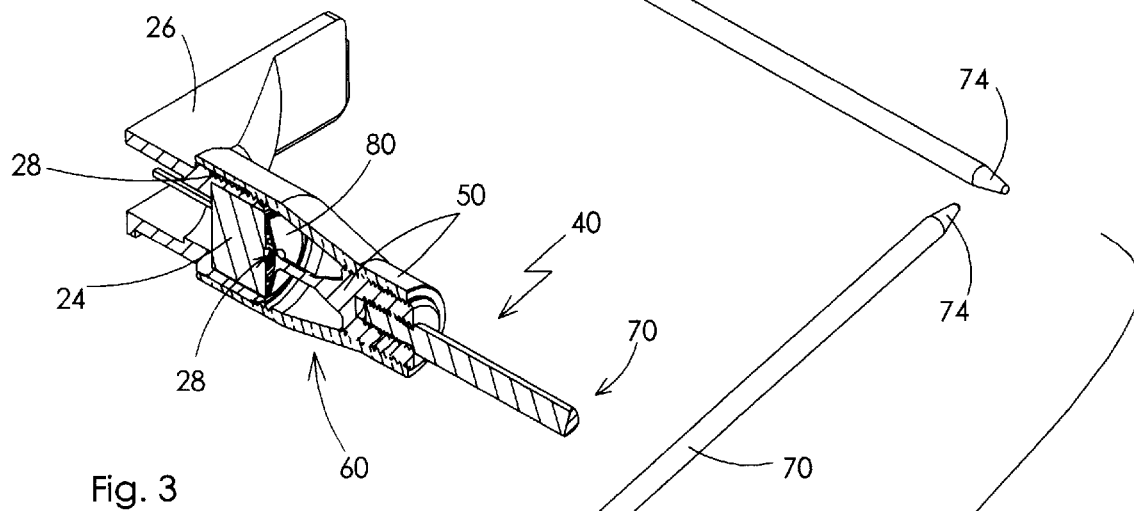
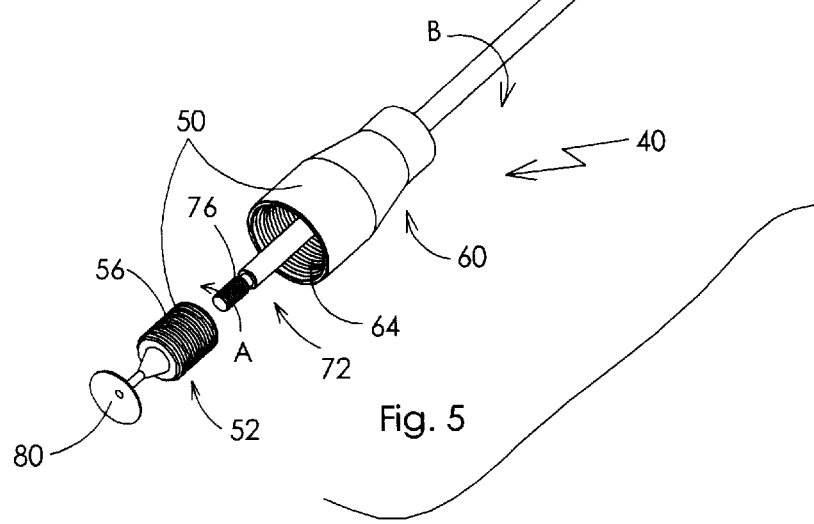

SIGNAL DETECTION INSTRUMENT WITH TOUCH PROBE RESONATOR ASSEMBLY FOR USE THEREWITH

FIELD OF THE INVENTION

The present invention generally relates to the conversion of sound traveling in a first medium into sound traveling in a second medium for detection by a sensor, in order to monitor incoming signals and detect the presence of selected target signals contained within the universe of signals received. Thus, the present invention is even more specifically directed to signal detection instruments adapted to monitor input sound signals traveling within a solid and to convert these into airborne sound signals for further processing.

BACKGROUND OF THE INVENTION

Undesirable flow of a substance, such as a gas or liquid, into or out of a system is known as leakage. When the substance encounters friction, sound is generated. For small leaks, this sound is mostly in the ultrasonic range of frequencies, i.e. 20 kHz and higher, although a portion of its spectrum may also be in the audible range. Leaks occur through openings or "orifices" in the system which carries the gas or fluid. Normally these orifices are not smooth, well-defined holes, but rather cracks with many jagged edges and internal chambers. Fluid or gas escaping through such an orifice is forced into turbulence and this turbulent flow generates sound. The intensity of sound generated by a leak is a complex function of various factors such as viscosity, temperature, speed of the leak, the pressure differential across the leak and the physical characteristics of the orifice.

A variety of different signal detection instruments have been developed in the past in an effort to ascertain the presence of leaks. Many of these detection instruments include electronic circuits incorporating tuning circuitry adapted to receive, filter and process signals within a selected frequency range. For signal detectors specifically constructed to monitor a broad range of oscillatory signals, many employ super heterodyning in order to increase sensitivity, eliminate noise and shift frequency bands. One such signal detection instrument capable of ascertaining the presence of leaks in compressed air systems, or in most other pressurized fluid systems, is known as an ultrasonic leak detector. Ultrasonic leak detectors are specially adapted to detect ultrasonic signals created by the escape of pressurized gases through orifices. This is useful, for example, in detecting leakage from pipelines as well as detecting air flow paths through structural insulations and through automobile doors and panels. In these circumstances, sound generated at the leak point becomes airborne and travels to the detector's sensor, sometimes referred to as an airborne sensor, where it is converted into an electrical signal for further processing. Instruments particularly adapted for the detection of airborne sound are described in my U.S. Pat. No. 5,103,675 issued Apr. 14, 1992, my U.S. Pat. No. 5,436,556 issued Jul. 25, 1995 and my U.S. Pat. No. 5,432,755 issued Jul. 11, 1995.

Internal leaks in systems, however, are more difficult to detect because the sound that is generated at the leak point, due to turbulent flow or friction does not couple well with air to transfer the energy of the internal sound to the signal detector's airborne sensor. Accordingly, location of the leak becomes very difficult. In some circumstances, the sound generated by the leak is so weak that location is impossible. Another drawback of using a signal detection instrument's airborne sensor to locate internal leaks is that background noise or other competing sounds from the ambient environment flood the sensor effectively causing it to become insensitive to these lower sound levels generated from within the system.

Accordingly, where there is sound from an internal leak within an enclosure, such as a valve leak, a steam trap, or bearing friction, it is beneficial to employ a touch probe to detect the sound. In the past, ultrasonic leak detectors capable of detecting internal leaks have employed a touch probe mechanically coupled to an acoustic emission sensor so that the touch probe essentially acts as a conduit between sound traveling within a solid and the acoustic emission sensor. In use, a user would necessarily contact the solid with the touch probe in order to detect the sound and then convert this sound into an electrical signal with the acoustic emission sensor for further processing. For enclosures which are not under pressure, it is also known to utilize an ultrasonic signal generator in conjunction with an ultrasonic signal detector when investigating the existence of internal leaks. The generator is typically placed inside the enclosure and generates an ultrasonic tone which will follow the empty passage a gas or liquid would travel, thereby producing a leak. The point of exit of this ultrasonic tone can then be determined with the ultrasonic signal detector.

The majority of ultrasonic detectors prevalent in the market are capable of detecting either external leaks through the use of an airborne sensor or internal leaks through the use of an acoustic emission sensor, but not both. However, one device which is capable of detecting both internal and external leaks is described in my pending U.S. patent application Ser. No. 08/986,635 filed Dec. 8, 1997, and entitled "Signal Detector and Method for Detecting Signals Having Selected Frequency Characteristics". Here, the detector's housing accommodates both an airborne sensor for detecting external leaks and an acoustic emission sensor used in conjunction with a touch probe to detect internal leaks. While this integrated instrument has proven quite versatile, it does result in the use of additional components because each sensor requires its own associated pre-amplification circuitry in order to necessarily condition the incoming signals appropriately for the instrument. It, therefore, becomes necessary to recalibrate the instrument if the sensors are switched because it must appear to the instrument's processing circuitry that the same sensor is being employed. As a result, while such a detector is more versatile for monitoring leaks in a variety of environments, it is relatively expensive to produce and can be inconvenient as a result of the need to recalibrate the instrument due to the differing characteristics of the sensors.

Accordingly, there remains a need to provide a new and improved signal detection instrument for monitoring both internal and external leaks in systems, where the instrument is less expensive and does not require recalibration for each type of sensor. It would also be desirable to provide converter for use with the airborne sensor associated with existing ultrasonic signal detectors to provide this versatility by converting sounds traveling within a solid into airborne sound. The present invention is directed to meeting these needs.

SUMMARY OF THE INVENTION

It is an object of the present invention to provide a new and useful resonator assembly for use with a signal detection instrument to convert sound traveling within a touch rod into airborne sound for detection by a sensor.

Another object of the present invention is to provide a new and useful touch probe resonator adapted for use with a signal detection instrument to convert sound traveling in a first medium into sound traveling in a second medium for detection by the instrument's sensor.

A further object of the present invention is to provide such a touch probe resonator which can be retrofitted to an existing signal detection instrument's housing.

Still a further object of the present invention is to provide a new and useful signal detection instrument, incorporating such a touch probe resonator, for monitoring input sound signals associated with an internal leak and for producing an output in response thereto.

Yet another object of the present invention is to provide a signal detection instrument capable of monitoring sound generated by both internal and external ultrasonic leaks, which signal detection instrument is easier to manufacture and less expensive than its competitive counterparts.

To accomplish these objectives, the present invention is in one sense directed to a resonator assembly adapted for use with a signal detection instrument that includes a sensor and a touch rod. The resonator assembly is operative to convert sound traveling within the touch rod into airborne sound for detection by the sensor and broadly includes a mount, a flexible resonator element and a stem. The mount is adapted to interconnect to the signal detection instrument and the touch rod. The stem interconnects the mount and the resonator element so that, when the touch rod is secured to the mount and the mount is secured to the signal detection instrument thereby to position the resonator element relative to the sensor, the resonator element operates to convert sound traveling within the touch rod into airborne sound for detection by the sensor.

Where the signal detection instrument already includes a nosecone associated with the sensor, the present invention contemplates a mount that is adapted to interconnect to the touch rod as well as the nosecone. To this end, the mount may include first mounting threads adapted to threadedly engage the touch rod and second mounting threads adapted to threadedly engage the signal detection instrument, and specifically its nosecone, so that the mount is releasably securable to each. Alternatively, where the signal detection instrument is not provided with a nosecone, the mount may include a mounting head formed integrally with the stem and a separate adapter for interconnecting the mounting head to the signal detection instrument. Here, the mounting head may include internal threads adapted to releasably secure to the touch rod and external threads adapted to threadedly engage the adapter, which adapter may also be releasably securable to the signal detection instrument. The adapter, thus, may have adapter threads for threadedly engaging the signal detection instrument.

The stem may include a conical piece joined to the mounting head and a longitudinally extending neck portion interconnecting the conical piece and the resonator element. The conical piece is tapered in construction toward the neck portion thereby to concentrate energy passing from the mounting head to the neck portion. The resonator element may take on a variety of different configurations, such as discoidal or conical. It is preferred that the mounting head, the resonator element and the stem be integrally formed as a single piece construction although they can also be constructed as separate pieces that are attached to one another.

The present invention is also directed to a touch probe resonator adapted for use with a signal detection instrument that includes a sensor. The touch probe resonator operates to convert sound traveling in a first medium into sound traveling in a second medium for detection by the sensor, and broadly includes a mount, an elongated touch rod and a resonator element. The mount is adapted to secure to the signal detection instrument and the elongated touch rod has a proximal end portion supported by the mount and an opposite distal tip. The resonator element is connected to the mount and is adapted to be positioned proximately to the sensor when the mount is secured to the signal detection instrument. The touch probe resonator operates upon contact of the distal tip with the first medium to provide a conduit between the first medium and the sensor whereby sound traveling within the first medium propagates along the elongated touch rod toward the resonator element causing the resonator element to vibrate at selected vibration frequencies and to generate sound traveling in the second medium for detection by the sensor. A stem may be included for interconnecting the mount and the resonator element so that the resonator element is mechanically coupled to the touch rod when the touch rod is supported by the mount.

The proximal end portion of the elongated touch rod is adapted to releasably engage the mount. To this end, the proximal end portion is threaded and the mount includes internal threads adapted to threadedly engage the proximal end portion and external threads adapted to threadedly engage the signal detection instrument. The mount, the resonator element and the stem may be constructed as above.

A signal detection instrument is also provided for monitoring input sound signals having frequencies over a selected range and for producing an output in response thereto. Broadly, the signal detection instrument comprises a housing, a sensor assembly, processing circuitry and an output device.

The sensor assembly is operative to detect the input sound signals and to produce received signals in response thereto. The sensor assembly includes an elongated touch rod, a resonator assembly and a sensor. The resonator assembly is provided with a mount that supports a proximal end portion of the elongated touch rod. The resonator assembly is operative upon contact of the touch rod's distal tip with a first sound carrying medium to provide a conduit between the first medium and the sensor whereby the input sound signals traveling within the first medium propagate along the elongated touch rod toward the resonator assembly causing the resonator assembly to vibrate at selected vibration frequencies determined by the input sound signals and to generate output signals traveling in the second medium. The sensor is supported by the housing and positioned proximately to the resonator assembly. This sensor operates to detect these output sound signals and to produce the received signals in response thereto.

The processing circuitry is contained within the housing and operates to process the received signals and to produce processed signals. The output device produces selected output in response to these processed signals. Each of the components which make up the sensor assembly may be constructed as discussed above with reference to the resonator assembly and the touch probe resonator of the present invention.

BRIEF DESCRIPTION OF THE DRAWINGS

FIG. 3 is an enlarged view in cross-section of the front end of the signal detection instrument in FIGS. 1 and 2 and its associated touch probe resonator;

FIG. 4 is an exploded perspective view of the touch probe resonator according to the present invention;

FIG. 5 is another exploded perspective view of the touch probe resonator according to the present invention;

DETAILED DESCRIPTION OF THE EXEMPLARY EMBODIMENT

The present invention is directed to sensor assemblies for use with instruments which detect sound signals, especially those instruments adapted to respond over a selected range to convert ultrasonic and sonic signals into a display which may be audible, visual or both. More particularly this invention is directed to a versatile signal detection instrument that is capable of monitoring the existence of leaks, and particularly sound produced from friction, that are either present internally within a system or escape from a system into the ambient environment.

It should be understood that the features of the present invention for purposes of the exemplary embodiment are described with respect to the detection of sonic or ultrasonic signals. However, it should be further appreciated and understood that the techniques described herein can be employed to monitor other types of detectable signals to which a transducer may respond to produce an electrical signal for further processing.

Figure 1:
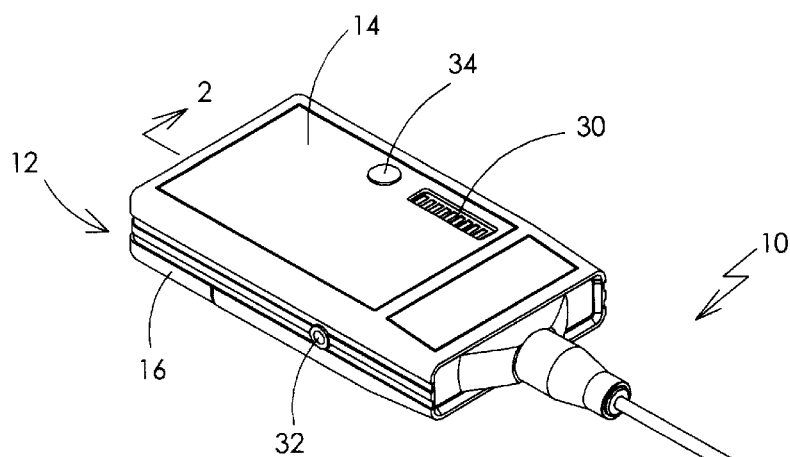
FIG. 1 is a perspective view of a signal detection instrument according to the present invention.
Figure 2:
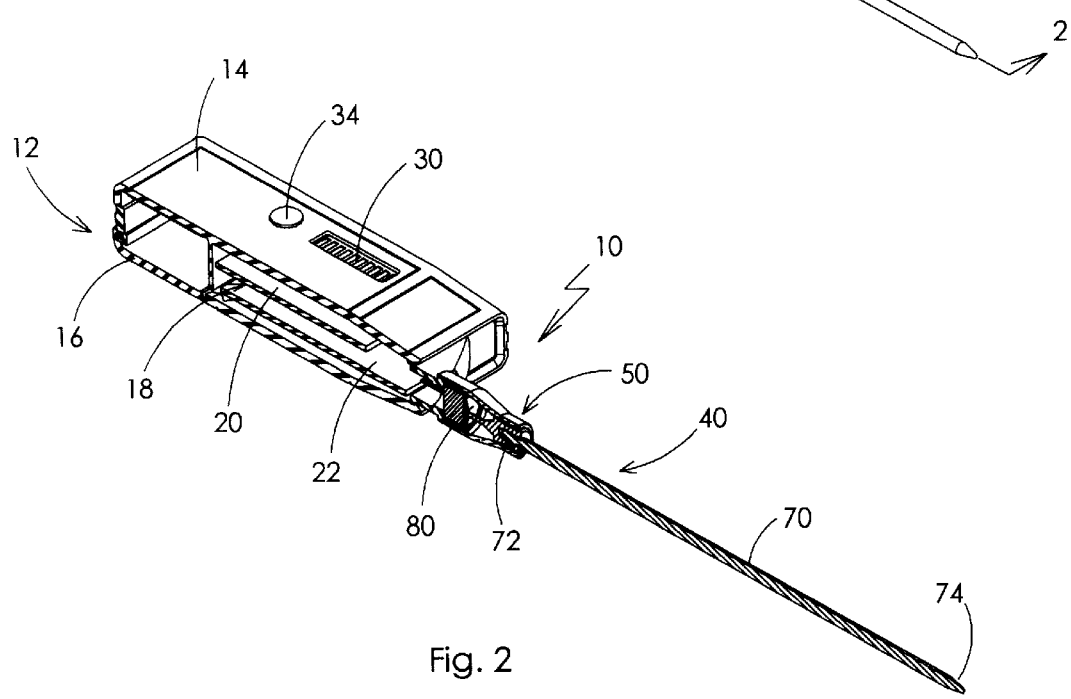
FIG. 2 is a perspective view, in cross-section, of the signa detection instrument as viewed about lines 2—2 in FIG. 1.

With initial reference to FIGS. 1 and 2, signal detection instrument 10 according to the present invention has a housing 12 which includes an upper casing 14 and a lower casing 16 joined together in a connected state. Housing 12 encloses the appropriate processing circuitry 18 which preferably includes analog and digital processing circuitry mounted on independent, yet electrically interconnected circuit boards 20 and 22. A sensor 24 is in the form of a suitable transducer with sensor 24 being selected of a type to receive input sonic and/or ultrasonic signals and to convert them into suitably corresponding received signals for further processing by processing circuitry 18. To this end, sensor 24 is preferably an ambient air sensor in the form of a microphonic device to detect sonic and/or ultrasonic signals in ambient air.

Mounted relative to sensor 24 is a touch probe resonator 40 which is adapted to mount onto signal detection instrument 10 relative to sensor 24. Touch probe resonator 40 is operative to convert sound traveling in a first medium into sound traveling in a second medium for detection by sensor 24. As best shown in FIGS. 2 and 3, touch probe resonator 40 broadly includes a mount 50 adapted to secure to signal detection instrument 10, an elongated touch rod 70 supported by mount 50 and a resonator element 80. Resonator element 80 is connected to mount 50 and positioned in close proximity to sensor 24 such that a gap 28 exists therebetween. Mount 50 is mechanically coupled to the front end 26 of signal detection instrument 10, commonly referred to as a horn, which houses sensor 24. Mount 50, therefore, is mechanically coupled to each of elongated touch rod 70 and resonator element 80 to connect them to front end 26 and position them relative to sensor 24.

Elongated touch rod 70, which may be constructed integrally or as a plurality of rod sections joined to one another, has a proximal end portion 72 supported by mount 50 and an opposed distal tip 74. In operation, when the distal tip 74 of elongated touch rod 70 comes into contact with a first sound carrying medium, such as a steam trap or piping, elongated touch rod 70 provides a conduit between this first medium and sensor 24 whereby the input sound signals traveling within the first medium propagate along elongated touch rod 70 toward resonator element 80. Resonator element 80 is thereby caused to vibrate at selected vibration frequencies determined by these input sound signals and generate output sound signals traveling in a second medium that is defined by gap 28. These output sound signals traveling in gap 28 are detected by sensor 24 which then produces the received signals for further processing.

Processing circuitry 18 operates to process these received signals generated by sensor 24 and produce processed signals determined by the various circuitry components which make up processing circuitry 18. It is desirable to display these processed signals either audibly, visually, or both to a user in order to convey to the user information pertaining to the detected leak, namely its strength and proximity. To this end, housing 12 also supports a signal strength indicating meter 30 which, in FIGS. 1 and 2, may be in the form of an array of light emitting diodes which are operative to visually output the signal strength of the processed signals. Of course, the ordinarily skilled artisan should appreciate that other types of displays could also be employed. In any event, audible output indicative of the detected signals can be obtained by way of earphones (not shown) which can be electrically connected to processing circuitry 18 via headphone jack 32. An activation switch 34 is provided to toggle signal detection instrument 10 on and off.

With the exception of those components discussed above which comprise touch probe resonator 40, signal detection instrument 10 may be any of a variety of ultrasonic signal detectors available in the marketplace, provided that mount 50 is adapted to mechanically interconnect the elongated touch rod 70 and the resonator element 80 to signal detection instrument 10. Preferably, though, signal detection instrument 10 may be in the form of either that described in my earlier U.S. Pat. No. 5,103,675, issued Apr. 14, 1992, or my earlier U.S. Pat. No. 5,432,755, issued Jul. 11, 1995. The disclosures of these two patents are incorporated herein by reference. From the discussion to follow pertaining to touch probe resonator 40, it should be appreciated by the ordinarily skilled artisan that the present invention contemplates a touch probe resonator which can be retrofitted to any of a variety of existing signal detection instruments used in detecting external leaks, in order to convert the signal detection instrument into one which is additionally capable of detecting internal leaks associated with a system by converting sound traveling within the touch rod into airborne sound for detection by an appropriate sensor associated with the signal detection instrument. With this in mind, then, the preferred construction for touch probe resonator 40 according to exemplary embodiment of the present invention, as well as its various components, may now be appreciated with reference to FIGS. 4–9.

As stated above, touch probe resonator 40 broadly includes mount 50, elongated touch rod 70 and resonator element 80, as seen in FIGS. 4 and 5. Mount 50 is shown here to include both a mounting head 52 adapted to releasably secure to elongated touch rod 70 and a separate adapter 60 for releasable securement to a signal detection instrument. It should be appreciated that, while mount 50 is described herein to incorporate two separate elements for positioning both the elongated touch rod 70 and the resonator element 80 relative to a signal detection instrument's sensor, a single piece construction is also contemplated. That is, where the signa 10 detection instrument incorporates a nose cone on its front end similar in construction to adapter 60, then it is contemplated that mount 50 need only include an appropriately constructed mounting head 52 that is adapted to secure to the signal detection instrument, and particularly its nose cone, and an elongated touch rod 70 in order to position the elongated touch rod 70 1 5 and the resonator element 80 proximate to the instrument's sensor. For those signal detection instruments, however, which do not employ a nose cone, then the two-piece construction shown in FIGS. 4 and 5 is preferred A preferred method for assembling touch probe resonator 40 is to insert a portion of elongated touch rod 70 through adapter 60 so that 20 proximal end portion 72 is exposed, as shown in FIGS. 4 and 5. Proximal end portion 72, which is formed to include threads 76, may then be releasably secured to mounting head 52 by threadedly engaging threads 76 with the mounting head's internal threads 54 and rotating clockwise in the direction of arrow "A". Once done, adapter 60 can be slidably disposed over mounting head 52 so that first adapter threads 62 releasably engage external threads 56 associated with mounting head 52 by rotating mounting head 52 counter clockwise in the direction of arrow "B". It should be understood that the directions of arrows "A" and "B" could be reversed or they could be in the same direction. After assemblage of touch probe resonator 40, it can then be secured to the front end 26 of the signal detection instrument in a manner shown in FIG. 3. More particularly, and as shown in FIG. 5, adapter 60 includes second adapter threads 64 which may releasably engage associated threads 28 formed on the front end 26, as shown in FIG. 3. Of course, it should be appreciated by the ordinarily skilled artisan that other types of mounting and releasing mechanisms could be employed in order to secure these various parts together, such as snap fitting, friction fitting or a bayonet, to name only a few, so that the present invention should not be unduly limited to the threading arrangements discussed herein.

The construction of touch probe resonator 40 permits resonator element 80 to be selectively positioned proximately to the signal detection instrument's sensor at a desired spacing distance therefrom. For instance, and with reference again to FIG. 3, it should be appreciated that the threaded engagement of mounting head 52 with adapter 60 can be selectively adjusted to alter the size of gap 28 defined between resonator element 80 and sensor 24. Such selective adjustment may be desirable, for example, to appropriately position resonator element 80 proximately to sensor 24 in order to optimize detection characteristics.

With an appreciation of the assemblage of touch probe resonator 40 to the front end 26 of the signal detection instrument, it should be understood now how touch probe resonator 40 provides a conduit between a first medium and sensor 24. With reference to FIGS. 3–5, contact of distal tip 74 with a first medium allows sound traveling in the first medium to propagate along elongated touch rod 70 towards its proximal end 72. As proximal end 72 is mechanically coupled to mounting head 52, the sound also propagates through mounting head 52 toward resonator element 80. Resonator element 80 is thereby caused to vibrate at selected vibration frequencies determined by the characteristics of the detected sound to generate compression waves within gap 28 which are then detected by sensor 24 and further processed.

Figure 6:
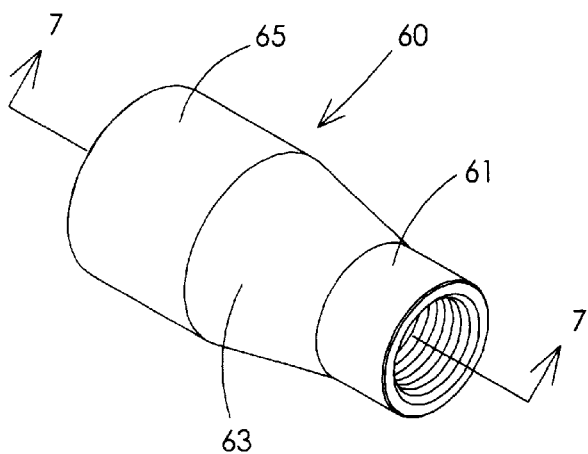
FIG. 6 is a perspective view of the adapter which may form a component part for the touch probe resonator and the resonator assembly of the present invention.
Figure 7:
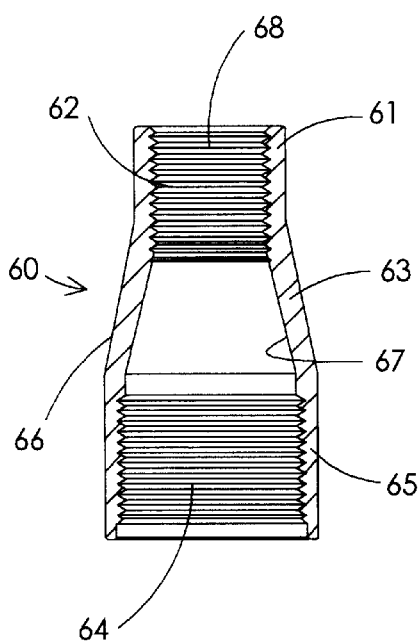
FIG. 7 is a cross-sectional side view of the adapter as viewed about lines 7—7 in FIG. 6.

As shown in FIGS. 6 and 7, adapter 60 is preferably frustoconical in configuration and formed of a plastic material, although a metallic material would also work. As such, adapter 60 has an outer surrounding sidewall 66 which encloses an interior 68. Sidewall 66 has a narrow upper portion 61 which is cylindrical in cross-section and includes first adapter threads 62 Joined to upper portion 61 is an outwardly tapered mid-section 63 having a smooth inner wall 67. A lower cylindrical portion 65 is joined to tapered mid-section 67 and is provided with second adapter threads 64. Lower cylindrical portion 65 has a larger diameter than upper portion 61 so that lower portion 65 is sized and adapted to releasably engage the signal detection instrument's front end.

Figure 8:
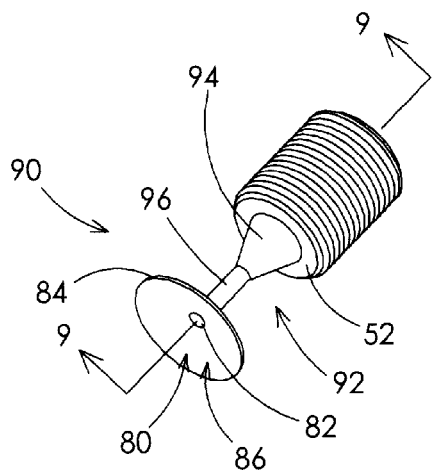
FIG. 8 is a perspective view of the resonator assembly according to the present invention.
Figure 9:
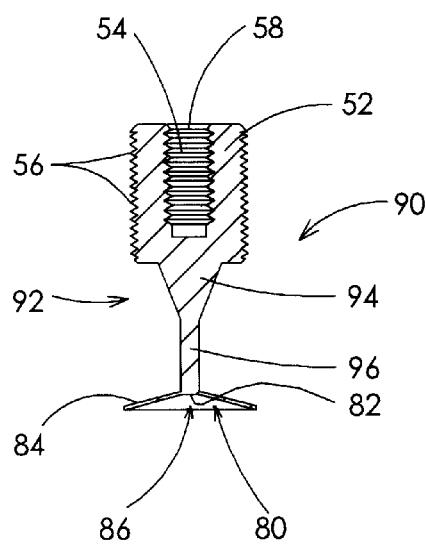
FIG. 9 is a cross-sectional side view of the resonator assembly as viewed about lines 9—9 in FIG. 8

The resonator assembly 90 that forms a component part of touch probe resonator 40 is shown in FIGS. 8 and 9. Resonator assembly 90 is an intregally constructed metallic element which broadly includes mounting head 52, flexible resonator element 80 and a stem 92 which interconnects mounting head 52 to resonator element 80. Mounting head 52 is a cylindrical body which includes a central bore 58 provided with internal threads 54. Central bore 58 is sized and adapted to accommodate the proximal end portion 72 of elongated touch rod 70 so that internal threads 54 can releasably engage threads 76 associated with elongated touch rod 70.

External threads 56 are formed around the periphery of mounting head 52 and are adapted to releasably engage first adapter threads 62.

It is preferred that stem 92 include a conical piece 94 joined to mounting head 52 and a longitudinally extending neck portion 96 interconnecting conical piece 94 to resonator element 80. Conical piece 94 preferably tapers in construction toward the narrower neck portion 96 in order to concentrate energy passing from mounting head 52 toward neck portion 96, and ultimately to resonator element 80.

Figure 10:
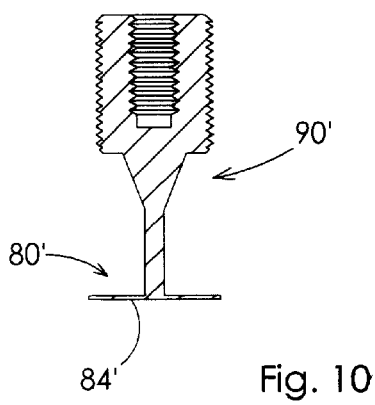
FIG. 10 is a cross-sectional side view showing an alternative construction for the resonator assembly.

Preferably, resonator element 80 is configured as a conical shell so that it has an apex 82 intregally formed with neck portion 96 and a conic periphery 84 which flares outwardly therefrom to form a hollow conic interior 86. It is preferred that the resonator's periphery 84 closely approximates the size of the detection instrument's sensor. Alternatively, and as shown in FIG. 10, resonator element 80' may be discoidal in configuration so that it forms a flattened base 84' for resonator assembly 90'. However, it is believed that constructing resonator element 80 as a conical shell results in improved performance characteristics because such a construction allows for easier flexing as compared to the discoidal configuration. Of course, it should be appreciated that the resonator element 80 could take on a variety of different shapes and forms other than those discussed herein. As long as the selected configurations is one which permits the resonator element to vibrate at selected vibration frequencies and generate compression waves determined by the characteristics of the detected sound.

It should be appreciated from the foregoing discussion that the present invention in one sense relates to a resonator assembly adapted for use with a signal detection instrument which includes a sensor and a touch rod, with the resonator assembly operative to convert sound traveling within the touch rod into airborne sound for detection by the sensor.

This resonator assembly broadly includes a mount, a flexible resonator element and a stem interconnecting the mount and the resonator element. Where the signal detection instrument is constructed to include a nose cone similar to the adapter discussed herein, then the mount associated with resonator assembly only includes an appropriately configured mounting head which is sized and adapted to receive both the elongated touch rod and secure to the signal detection instrument's nose cone. However, where the signal detection instrument does not employ a nose cone, then it is contemplated that the mount associated with the resonator assembly necessarily includes both the mounting head and the frustoconical adapter, or other appropriately constructed adapter, described herein with reference to FIGS. 6 and 7. The ordinarily skilled artisan should readily appreciate that the same is contemplated for the touch probe resonator of the present invention which broadly comprises an elongated touch rod, a resonator element and a mount, which may either be a mounting head alone or a mounting head plus an adapter.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A resonator assembly adapted for use with a signal detection instrument that includes a sensor operative to detect airborne sound signals and a touch rod, said resonator assembly operative to convert sound signals traveling within the touch rod into the airborne sound signals for detection by the sensor, comprising:
   (a) a mount adapted to interconnect the signal detection instrument and the touch rod;
   (b) a flexible resonator element; and
   (c) a stem interconnecting said mount and said resonator element so that, when the touch rod is secured to said mount and said mount is secured to the signal detection instrument thereby positioning said resonator element relative to the sensor, said resonator element operates to convert the sound signals traveling within the touch rod into the airborne sound signals for detection by the sensor.

2. A resonator assembly according to claim 1 wherein said mount is adapted to releasably secure to both the signal detection instrument and the touch rod.

3. A resonator assembly according to claim 2 wherein said mount includes internal threads adapted to threadedly engage the touch rod and external threads adapted to threadedly engage the signal detection instrument.

4. A resonator assembly according to claim 1 wherein said mount includes a mounting head formed integrally with said stem and an adapter for interconnecting said mounting head to the signal detection instrument.

5. A resonator assembly according to claim 4 wherein said mounting head is adapted to releasably secure to the touch rod and said adapter may be releasably secured to the signal detection instrument.

6. A resonator assembly according to claim 5 wherein said mounting head includes internal threads adapted to threadedly engage the touch rod and external threads adapted to threadedly engage said adapter.

7. A resonator assembly according to claim 6 wherein said adapter includes adapter threads for threadedly engaging the signal detection instrument.

8. A resonator assembly according to claim 1 wherein said stem includes a conical piece joined to said mount and a longitudinally extending neck portion interconnecting said conical piece and said resonator element, said conical piece tapered in construction toward said neck portion thereby to concentrate energy passing from said mount at said neck portion.

9. A resonator assembly according to claim 1 wherein said resonator element is discoidal in configuration.

10. A resonator assembly according to claim 1 wherein said resonator element is configured as a conical shell.

11. A resonator assembly according to claim 1 wherein said resonator element is configured as a cone.

12. A resonator assembly according to claim 1 wherein said mount, said resonator element and said stem are integrally formed as a single piece construction.

13. A touch probe resonator adapted for use with a signal detection instrument which includes a sensor, said touch probe resonator operative to convert sound signals traveling in a first medium into sound signals traveling in a second medium for detection by the sensor, comprising:
   (a) a mount adapted to secure to the signal detection instrument;
   (b) an elongated touch rod having a proximal end portion supported by said mount and an opposite distal tip; and
   (c) a resonator element connected to said mount in such a manner that a peripheral edge of said resonator element is suspended from said mount for free and unconstrained movement and is adapted to be positioned proximately to the sensor when said mount is secured to the signal detection instrument, said touch probe resonator operative upon contact of said distal tip with the first medium to provide a conduit between the first medium and the sensor whereby the sound signals traveling within the first medium propagate along said elongated touch rod toward said resonator element causing said resonator element to vibrate at selected vibration frequencies and to generate the sound signals traveling in the second medium for detection by the sensor.

14. A touch probe resonator according to claim 13 wherein said proximal end portion is adapted to releasably engage said mount.

15. A touch probe resonator according to claim 14 wherein said proximal end portion is threaded and wherein said mount includes internal threads adapted to threadedly engage said proximal end portion and external threads adapted to threadedly engage the signal detection instrument.

16. A touch probe resonator according to claim 13 including a stem interconnecting said mount and said resonator element so that said resonator element is mechanically coupled to said elongated touch rod when said elongated touch rod is supported by said mount.

17. A touch probe resonator according to claim 16 wherein said stem includes a conical piece joined to said mount and a longitudinally extending neck portion interconnecting said conical piece and said resonator element, said conical piece being tapered in construction toward said neck portion thereby to concentrate energy passing from said mount to said neck portion.

18. A touch probe resonator according to claim 17 wherein said resonator element is discoidal in configuration.

19. A touch probe resonator according to claim 17 wherein said resonator element is conical in configuration.

20. A touch probe resonator according to claim 13 wherein said resonator element is discoidal in configuration.

21. A touch probe resonator according to claim 13 wherein said resonator element is conical in configuration.

22. A touch probe resonator according to claim 13 wherein said mount includes a mounting head joined to said stem and an adapter for interconnecting said mounting head to the signal detection instrument.

23. A touch probe resonator according to claim 22 wherein said adapter is frustoconical in configuration.

24. A touch probe resonator according to claim 22 wherein said mounting head is adapted to releasably secure to said elongated touch rod and said adapter may be releasably secured to the signal detection instrument.

25. A signal detection instrument for monitoring input sound signals having frequencies over a selected frequency range and for producing an output in response thereto, comprising:

(a) a housing;

(b) a sensor assembly operative to detect the input sound signals and to produce received signals in response thereto, said sensor assembly including:

(i) an elongated touch rod having a proximal end portion and an opposite distal tip;

(ii) a resonator assembly including a mount that supports said proximal end portion and a flexible resonator element that is suspended from said mount for free and unconstrained movement, said resonator assembly operative upon contact of said distal tip with a first sound carrying medium to allow the input sound signals traveling within the first medium to propagate along said elongated touch rod toward said resonator element causing said resonator element to vibrate at selected vibration frequencies determined by the input sound signals and to generate output sound signals traveling in a second medium; and (iii) a sensor supported by said housing and positioned proximately to said resonator assembly, said sensor operative to detect the output sound signals and to produce the received signals in response thereto;

(c) processing circuitry contained within said housing and operative to process said received signals to produce processed signals; and (d) an output device for producing a selected output in response to said processed signals.

26. A signal detection instrument according to claim 25 wherein said resonator assembly includes a stem interconnecting said mount and said resonator element so that said resonator element is mechanically coupled to said elongated touch rod.

27. A signal detection instrument according to claim 26 wherein said mount includes a mounting head joined to said stem and an adapter for interconnecting said mounting head to the signal detection instrument.

28. A signal detection instrument according to claim 27 wherein said adapter is frustoconical in configuration and includes first adapter threads operative to threadedly engage said mounting head and second adapter threads operative to threadedly engage said housing.

29. A signal detection instrument according to claim 28 wherein said mounting head includes internal threads adapted to releasably engage the proximal end portion of said elongated touch rod and external threads adapted to releasably engage the first adapter threads associated with said adapter.

30. A signal detection instrument according to claim 26 wherein said stem includes a conical piece joined to said mount and a longitudinally extending neck portion interconnecting said conical piece and said resonator element.

31. A signal detection instrument according to claim 30 wherein said conical piece is tapered in construction toward said neck portion thereby to concentrate energy passing from said mount to said neck portion and wherein said resonator element is conical in configuration.

32. A signal detection instrument according to claim 25 wherein said resonator element is conical in configuration.

33. A signal detection instrument according to claim 25 wherein said resonator element is discoidal in configuration.

34. A touch probe resonator adapted for use with a signal detection instrument which includes a sensor, said touch probe resonator operative to convert sound signals traveling in a first medium into sound signals traveling in a second medium for detection by the sensor, comprising:

(a) a mount adapted to secure to the signal detection instrument;

(b) an elongated touch rod having a proximal end portion supported by said mount and an opposite distal tip; and (c) a resonator element connected to said mount by an interconnecting stem and adapted to be positioned proximately to the sensor when said mount is secured to the signal detection instrument, said touch probe resonator operative upon contact of said distal tip with the first medium to provide a conduit between the first medium and the sensor whereby the sound signals traveling within the first medium propagate along said elongated touch rod toward said resonator element causing said resonator element to vibrate at selected vibration frequencies and to generate the sound signals traveling in the second medium for detection by the sensor.

35. A touch probe resonator according to claim 34 wherein said mount, said resonator element, and said stem are integrally formed as a single piece construction.

* * * * *